United States Patent [19]
van Blerk

[11] Patent Number: 4,860,143
[45] Date of Patent: Aug. 22, 1989

[54] TEMPERATURE/HUMIDITY INDICATOR FOR A FLOPPY DISK CASSETTE

[75] Inventor: Victor B. van Blerk, San Jose, Calif.
[73] Assignee: Verbatim Corp., Sunnyvale, Calif.
[21] Appl. No.: 122,143
[22] Filed: Nov. 17, 1987
[51] Int. Cl.⁴ ............................................. G11B 23/03
[52] U.S. Cl. .................................................... 360/133
[58] Field of Search ......................... 360/133, 60, 69; 73/337; 116/217

[56] References Cited

U.S. PATENT DOCUMENTS 2,446,361  8/1948  Clibbon .
4,590,532  5/1986  Saito .................................... 360/133

Primary Examiner—A. J. Heinz
Attorney, Agent, or Firm—Dennis P. Monteith

[57] ABSTRACT

An environmental indicator assembly in a floppy disk cassette provides a warning signal when the cassette has been subjected to either a high-moisture or a high-temperature condition either environment being potentially harmful to the disk. The indicator assembly includes a wax which melts in a high-temperature environment and a hygroscopic salt which breaks down in a high-moisture condition. If either the wax or the salt changes from a solid form, a warning flag automatically moves into a position viewable to a cassette user.

10 Claims, 2 Drawing Sheets

TEMPERATURE/HUMIDITY INDICATOR FOR A FLOPPY DISK CASSETTE

BACKGROUND OF THE INVENTION

1. Field Of The Invention

The present invention relates to apparatus for monitoring the environment of a floppy disk. More particularly, the invention relates to a temperature/humidity indicator for a floppy disk cassette.

2. Description Relative To The Prior Art

A magnetic floppy disk will normally function properly over a relatively wide range of humidity and temperature conditions. When exposed to an excessively high temperature over a period of time, however, a magnetic oxide and a binder of the disk have a tendency to separate resulting in media failure or in extreme cases depositing binder on a magnetic head resulting in signal failure; high humidity likewise tends to accentuate both head and disk wear.

Ideally, each use of a disk would be at room temperature and relative humidity in a range near fifty percent. Unfortunately, this is not always feasible, so the limitations of the magnetic media must be considered and either adhered to or compensated for through increased cost such as by customizing the design of a disk drive mechanism.

The small size of a 3.5-inch floppy disk cassette makes it very portable. The ease with which a "micro" cassette can be transported potentially exposes the floppy disk to even more hostile environments including extreme moisture and temperature which can destroy existing data or make a disk system incapable of properly recording.

SUMMARY OF THE INVENTION

The present invention recognizes that exposure of a floppy disk to an extreme environmental condition can cause media failure. An object of the invention therefore is to provide a floppy disk cassette with a warning signal if the disk has been exposed to either an extremely high moisture or a high-temperature condition. When the signal occurs, it is then time to copy the disk before disk system failure and/or data loss occurs.

The object of the invention is accomplished by mounting an actuatable warning indicator internally within a disk cassette for movement between two positions that are visually distinguishable from each other - a normal latched position in which the indicator is not viewable and a released position in which it is viewable. An environmental sensor, which changes from a first normal state to a second alternate state under the influence of an environment potentially harmful to the disk, controls the position of the warning indicator as a function of the state of the sensor.

In a presently preferred embodiment, the sensor comprises a wax and a hygroscopic salt; the wax melts at high temperature and the salt breaks down in a high-humidity condition. If a change of state of either were to occur, a spring-biased plunger, normally latched by the sensor when both the wax and salt are in solid form, resiliently bias the warning indicator into its released position. Preferably the entire warning indicator assembly—the sensor, the plunger, and the warning indicator—is contained within a leak-proof chamber to protect the disk from liquid wax or the salt if it breaks down.

An advantage of the invention is that a floppy disk user is warned that the disk has been exposed to an environment which may eventually result in loss of data or be harmful to the overall system—drive mechanism and media. This advantage of the invention, as well as other advantages, will become more apparent in the detailed description of preferred embodiments presented below.

DESCRIPTION OF THE DRAWINGS

The invention will be described with reference to the accompanying drawings, wherein.

DETAILED DESCRIPTION OF PREFERRED EMBODIMENTS

Figure 1:
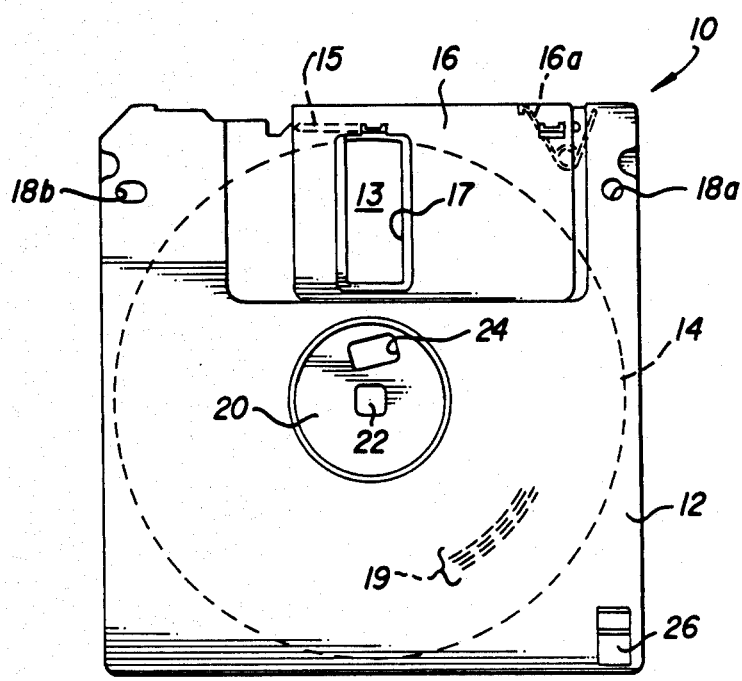
FIG. 1 is a bottom planar view of a floppy disk cassette.

FIG. 1 shows a bottom plan view of a floppy disk cassette generally designated 10. A jacket assembly 12 includes a pair of peripherally abutting housing halves each of which has a generally square perimeter configuration surrounding an elongated head-access opening 13. The housing halves which are comprised of a preformed rigid plastic material, such as for example injection molded ABS resin or the like, are preferably held together along the bottom peripheral edge, as viewed in the drawing, by a living hinge and along their other peripheral edges by means of ultrasonic welding or the like to form an internal compartment generally enclosing a flexible or so-called floppy disk 14. An elongated guide groove 15 serves as a track for a spring-biased slidably mounted shutter 16 which normally covers the head-access opening 13 to keep dirt, dust, etc. away from the disk 14.

Upon loading the cassette 10 into a drive mechanism (not shown), the shutter 16 assumes its actuated state (FIG. 1) against the influence of its bias spring 16a wherein an elongated aperture 17 of the shutter overlaps the head-access opening 13 to expose the disk 14. Also during loading, the disk 14 moves into contact with a magnetic head extending into the head-access opening 13 on the bottom side.

The drive mechanism rotates the disk 14 about a central axis for recording and/or playing back data from generally equally spaced record tracks 18 encircling the rotational axis of the disk. To that end, a centrally disposed circular member 20 functions as a drive hub for the disk 14. For that purpose, the member 20 includes an on-axis generally square aperture 22 for receiving a disk alignment pin and an off-axis a generally rectangular drive shaft insertion aperture 24 when the cassette 10 is loaded into the drive mechanism. A write protection device 26 is located near a corner of the cassette where it does not interefere with the disk 14.

To this point the element of the cassette 10 that have been described are conventional and are well known in the art. The cassette 10, however, unlike the prior art includes both a temperature indicator and a humidity indicator for providing a warning signal when the disk 14 has been exposed, respectively, to either an extremely high temperature or high moisture—either condition being potentially harmful to the disk 14 from the standpoint of accurately recording or playing back data. For that purpose, an actuatable warning indicator assembly is mounted internally within the cassette 10 for movement between two visually distinguishable positions—a normal latched position in which a warning indicator such as a flag, symbol or the like is not viewable and an unlatched or released position in which the warning indicator is viewable, to signal that the disk has been exposed to a potentially harmful environment. To that end, the cassette 10 includes a window 39 (FIG. 2) for viewing the warning indicator when the indicator assembly has been unlatched.

Figure 2:
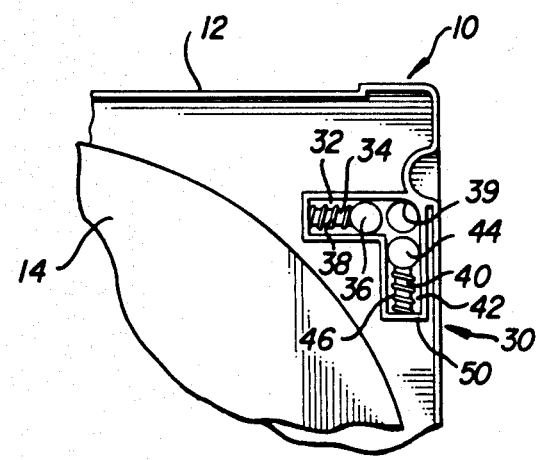
FIG. 2 shows an outer shell of the cassette in an open position illustrating a presently preferred embodiment of a temperature and/or humidity indicator assembly in accordance with the invention.

FIG. 2 shows the hinged jacket assembly 12 in an open position to illustrate a presently preferred embodiment of a warning indicator assembly denoted generally 30. For the purpose of sensing a high-temperature condition, the indicator assembly 30 includes a temperature-sensitive material comprising a plug of wax 32 which melts when subjected to a temperature above a predetermined level. When in its solid state, the wax 32 maintains a spring-loaded plunger 34 embedded in the wax in a latched, blocked or "frozen" position in which a high-temperature warning flag 36, attached to the plunger, is held in a non-viewable position. When the cassette 10 is subjected to an environment having a temperature above the aforementioned predetermined level, the wax 32 melts, thereby freeing the plunger 34 from its latched or frozen position. When this happens, the plunger 34, under the influence of its coil spring 38, urges the flag 36 from its non-viewable position into a released position aligned with the window 39, wherein it is visible to a cassette user.

To sense a high-humidity condition, a block of hygroscopic salt 40 serves as a moisture-sensitive material to sense a high-humidity condition. To that end, the salt 40 breaks down—changes from a solid state to a liquid or an at least partially dissolved state—when the cassette 10 is exposed to an environment having a humidity condition in excess of a given percentage. When in its solid form, the salt 40 retains a spring-loaded plunger 42 in a latched position in which a high-humidity warning FIG. 44, attached to the plunger 42, is held in a non-viewable position. When the cassette 10 is subjected to an environment having a humidity above the aforementioned given level, the salt 40 breaks down. This change in state allows the plunger 42, under the influence of its bias spring 46, to drive the warning flag 44 adjacent the window 39 so as to be viewable by a cassette user.

The cassette 10 includes a leak-proof chamber retaining the wax and the hygroscopic salt to protect the disk 14 when either sensor changes from a solid to a liquid state. An enclosed structure 50 serves as walls for the chamber. To that end, the structure 50, which is formed conveniently by an injection molding operation of the ABS resin, is integral with one half of the jacket assembly 12. The leak-proof chamber is enclosed when the two halves of the jacket assembly 12 are welded together.

Figure 3A:
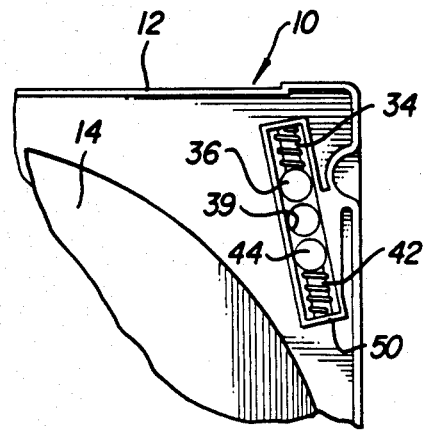
FIGS. 3A and 3B show alternate preferred arrangements of a temperature and/or humidity indicator assembly.
Figure 3B:
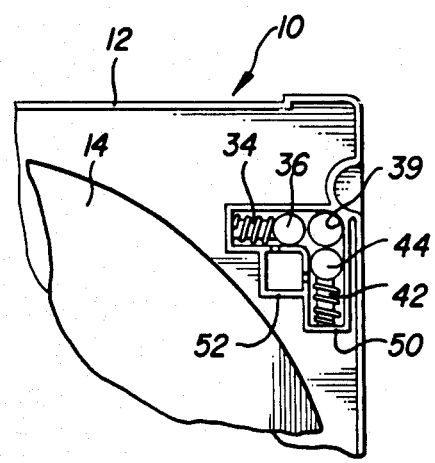

FIGS. 3A and 3B show alternate preferred embodiments of the warning indicator assembly 30. In the embodiment of FIG. 3A, the plungers 32 and 44 are aligned face-to-face for movement in opposite directions along a common axis. In the embodiment of FIG. 3B, the walls of the leak-proof chamber define a side pocket 52 for retention of the wax or the salt when either changes from a solid to a liquid state. With the side pocket 52, the "unlatched" plunger can urge the appropriate warning flag into a viewable position with limited resistance from the sensor material converted to a liquid state.

ADVANTAGEOUS TECHNICAL EFFECT

From the foregoing it is apparent that there has been disclosed an improved floppy disk cassette having a warning indicator that appears automatically when the disk has been subjected to an environment having either an extremely high moisture content or a high temperature. When the warning indicator appears, it provides an immediate signal to a cassette user to copy the disk before media failure occurs.

What is claimed is:

1. In a cassette comprising a pair of opposed major surfaces spaced from each other to form an internal compartment enclosing a disk arranged for rotation for recording data on, and playing back data from, a plurality of record tracks encircling the rotational axis of the disk, the improvement comprising:
    (a) an actuatable indicator mounted internally within said cassette for movement between (1) a first normal position in which said indicator is non-viewable, and (2) a second position in which said indicator is viewable; and
    (b) a temperature-sensitive element which retains said indicator in its normal non-viewable position so long as said temperature-sensitive element is not exposed to an environment having a temperature above a level that is potentially harmful to the disk and which enables said indicator to be moved to its viewable position when said temperature-sensitive element is subjected to an environment having a temperature above the aforementioned level.

2. In a cassette comprising a pair of opposed major surfaces spaced from each other to form an internal compartment enclosing a disk arranged for rotation for recording data on, and playing back data from, a plurality of record tracks encircling the rotational axis of the disk, the improving comprising:
    (a) an actuatable indicator mounted internally within said cassette for movement between two positions that are visually distinguishable; and
    (b) a temperature-sensitive element which controls which one of the two positions said indicator is in depending on whether or not said temperature-sensitive element is subjected to an environment having a temperature above a predetermined level.

3. A cassette as defined in claim 2 wherein said temperature-sensitive element changes from a normal solid state to a liquid state when subjected to a temperature above a given level, and said actuatable indicator is coupled to a spring-loaded plunger which moves said indicator from a normal non-viewable position to a viewable position in response to said temperature-sensitive element assuming its liquid state.

4. A cassette as defined in claim 3 wherein said temperature-sensitive element is a wax.

5. In a cassette comprising a pair of opposed major surfaces spaced from each other to form an internal compartment enclosing a disk arranged for recording data on, and playing back data from, a plurality of record tracks on the disk, the improvement comprising:
    (a) an indicator mounted internally within said cassette for movement between (1) a first normal position in which said indicator is non-viewable, and (2) a second released position in which said indicator is viewable; and (b) an environmental sensor which changes from a first normal state to a second modified state under the influence of either a temperature condition or a humidity condition potentially adverse to the disk, said environmental sensor being arranged to control as a function of its state which one of the two positions said indicator is in, said environmental sensor maintaining said indicator in its normal non-viewable position so long as said environmental sensor remains in its normal first state and said environmental sensor enabling said indicator to move to its released position when said environmental sensor assumes its modified state.

6. In a cassette comprising a pair of opposed major surfaces spaced from each other to form an internal compartment enclosing a disk arranged for rotation about a central axis for recording data on, and playing back data from, a plurality of record tracks encircling the rotational axis of the disk, the improvement comprising:

(a) an actuatable indicator mounted internally within said cassette for movement between two visibly distinguishable positions; and (b) a moisture-sensitive element which controls which one of the two positions said indicator is in depending on whether or not said moisture-sensitive element is subjected to an environment the humidity of which is above a predetermined level.

7. A cassette as defined in claim 6 wherein said moisture-sensitive element changes from a solid form to at least a partially dissolved form when subjected to an environment having a humidity above a given percentage, and said actuatable indicator is coupled to a spring-loaded plunger which moves said indicator from a normal non-viewable position to a viewable position in response to said moisture-sensitive element assuming a partially dissolved form.

8. A cassette as defined in claim 7 wherein said moisture-sensitive element is a hygroscopic salt.

9. In a cassette comprising a pair of opposed major surfaces spaced from each other to form an internal compartment enclosing a disk arranged for rotation for recording data on, and playing back data from, a plurality of record tracks encircling the rotational axis of the disk, wherein the improvement comprises:

(a) at least one of said major surfaces including means for viewing a signal that is within said compartment; and (b) a temperature-sensitive mechanism arranged internal to said cassette to provide in alignment with said viewing means (1) a first signal indicating that said cassette has not been exposed to a environment having a temperature above a level that is potentially harmful to the disk, and (2) a second signal indicating that said cassette has been subjected to an environment having a temperature above the aforementioned level.

10. In a cassette comprising a pair of opposed major surfaces spaced from each other to form an internal compartment enclosing a disk arranged for rotation for recording data on, and playing back data from, a plurality of record tracks encircling the rotational axis of the disk, wherein the improvement comprises:

(a) at least one of said major surfaces including means for viewing a signal that is within said compartment; and (b) a moisture-sensitive mechanism arranged internal to said cassette to provide in registration with said viewing means a first signal or a second signal depending, respectively, on whether or not said cassette has been subjected to a environment the humidity of which is above a predetermined level.

* * * * *